United States Patent [19]

Skafvenstedt et al.

[11] Patent Number: 4,567,492
[45] Date of Patent: Jan. 28, 1986

[54] PAPER TRANSPORT DEVICE FOR A RECORDER

[75] Inventors: Bengt Skafvenstedt, Stockholm; Sture Ahlgren, Vaellingby, both of Sweden

[73] Assignee: Siemens Aktiengesellschaft, Berlin & Munich, Fed. Rep. of Germany

[21] Appl. No.: 413,168

[22] Filed: Aug. 30, 1982

[30] Foreign Application Priority Data

Sep. 28, 1981 [DE] Fed. Rep. of Germany ....... 3138517

[51] Int. Cl.$^4$ .......... G01D 15/26; B41J 11/42; B65H 25/26
[52] U.S. Cl. ............................ 346/136; 226/17; 226/21; 226/181; 400/579; 400/619
[58] Field of Search .......... 346/136, 76 PH, 33 TP, 346/46, 139, 145; 226/148, 21, 17, 181; 493/420; 400/579, 619

[56] References Cited

U.S. PATENT DOCUMENTS

| 3,552,621 | 1/1971 | Kupferschmidt | 346/136 X |
| 3,611,425 | 10/1971 | Alden | 346/136 |
| 3,798,659 | 3/1974 | Hasebe et al. | 346/136 |
| 4,048,782 | 9/1977 | Hamilton | 53/51 X |
| 4,125,254 | 11/1978 | Boyer | 270/68 A |
| 4,143,382 | 3/1979 | Brill et al. | 346/76 R |
| 4,213,135 | 7/1980 | Medvecky | 346/76 PH |
| 4,318,113 | 6/1982 | Skafvenstedt et al. | 346/136 |

OTHER PUBLICATIONS

Siemens Prospectus ME114/5562.101 (Mingograf 34), 1979.
Torrington Bearings Catalog 5760, 1975, p. 156.

Primary Examiner—Joseph W. Hartary
Assistant Examiner—Gerald E. Preston
Attorney, Agent, or Firm—Hill, Van Santen, Steadman & Simpson

[57] ABSTRACT

A paper transport device for a recorder such as an ink jet printer has a support for clean paper, guidance rollers, and a drive device. The transport devices moves the paper from the paper support past a printing head. In order to exert a symmetrical pull on the paper and simultaneously to make substantially the entire width of the paper available for writing thereon, the paper transport device has at least two rollers mounted on an axle rotated by the drive device, the rollers being disposed a distance from one another at right angles relative to the forward feed direction of the paper. The drive rollers are mounted on the axle so as to run freely on the axle in the direction of rotation of the axle, but lock when attempted to be rotated in the opposite direction so that skewed paper is easily and automatically aligned to move in a straight path. Each drive roller has an idler roller associated therewith.

6 Claims, 2 Drawing Figures

PAPER TRANSPORT DEVICE FOR A RECORDER

BACKGROUND OF THE INVENTION

1. Field of the Invention

The present invention relates to transport devices of the type useable in a recorder for moving a continuous paper web past a recording head in a straight path with substantially uniform tension.

2. Description of the Prior Art

A paper transport device for use in a recorder is known from German Pat. No. 20 10 019 which has a support means for the clean paper, rollers for guiding the paper, and a motor-driven means for moving the paper from the support means across a writing surface at which a recording means is disposed. In this conventional device, the means for actually moving the paper web is a turning roller which is driven by the motor and which has an idler roller associated therewith which, viewed in the forward feed direction of the paper web, engage one lateral edge of the paper web. Under certain conditions, this single-sided pull on the paper web may, particularly in the case of longer paper transport paths, cause the paper web to no longer be conveyed by the transport means in a straight line. Such skewing of the paper web causes curves and other data recorded on the paper web to become distorted.

One attempted solution to the skewing problem which is present in such conventional devices in the use of a pivotable turning roller by means of which the paper is always returned to the proper straight position. This attempted solution, however, operates satisfactorily only in combination with a paper web of a certain width, and when the width of the paper web exceeds this limitation, the single-sided pull on the paper still causes skewing of the paper web.

Another paper transport device is known from Siemens Prospectus ME 1114/5562.101, 1979 (the "Mingograf 34") in which the drive roller and the idler roller are disposed in the center of the paper web so that a symmetrical tension is exerted on the web. This structure, however, reduces the amount of paper width which is useable for recording or plotting due to the disposition of the idler roller in the center of the paper web. If the recording fluid has not yet completely dried when passing the rollers, the recording channel in the area of the rollers cannot generally be exploited.

SUMMARY OF THE INVENTION

It is an object of the present invention to provide a paper transport device for use in a recorder for transporting a continuous paper web past a recording head which self-adjusts to maintain the path of the paper web in a straight line and which makes substantially the entire paper width available for recording.

The above object is inventively achieved in a transport device for a recorder such as an ink jet printer, which transport device has at least two drive rollers or capstans driven by a common axle which are disposed on the axle at a distance relative to one another at right angles relative to the direction of paper forward feed. The drive rollers are mounted on the axle such that the rollers are freely movable in the direction of rotation of the axle, but lock in the opposite rotation direction. An idler roller is mounted for operation in combination with each of the drive rollers.

The paper transport device disclosed and claimed herein provides the advantage of exerting a symmetrical pull on the paper web across its entire width. Both drive rollers rotate at a speed prescribed by the angular velocity of the axle. Should the paper web for some reason become skewed such as, for example, as a result of crooked introduction of the paper into the transport device, the transport device automatically applies asymmetrical tension to the paper web so as to return the paper web to the proper straight-moving position. This is achieved quickly and automatically because, as a result of the unidirectional mounting of the drive rollers on the axle which permits the drive rollers to rotate at different speeds in the direction of rotation causing forward paper feed so that the trailing edge of the paper web is realigned without encountering significant resistance.

An embodiment of the transport device which is particularly structurally simple utilizes a common drive shaft for all of the drive rollers. In this embodiment, only a single drive means of prime mover is thus required for all of the drive rollers. A need for synchronization of the individual drive means, which would be necessary if different axles were utilized, is thus eliminated. The unidirectional bearings utilized in the invention disclosed and claimed herein, which run freely on the axle in one direction and lock when attempted to be rotated in the opposite direction may be, for example, of the type shown in Torrington Bearings Catalog 5760, 1975 at page 1156.

A further advantage of the paper transport means disclosed herein is that the tolerance requirements of the drive rollers can be considerably reduced as a result of the bearings which are utilized. Such tolerance demands in conventional devices are the primary factor making production of a truly symmetrical drive means with two or more rollers which are rigidly connected to the drive shaft a practical impossibility. In such conventional devices, even the slightest differences in diameter of the rollers is noticeable and acts to continuously and increasingly skew the paper web and thus the plotted curve becomes increasingly distorted, particularly in recorders having relatively long paper movement paths.

As described above, the simplest and most reliable positions for the drive rollers of the paper transport device are at the edge of the paper web at right angles relative to the direction of forward feed. Symmetrical tensioning of the web is thus guaranteed and, moreover, the entire paper width is free and unimpeded for use as a recording medium.

In a further embodiment of the invention, however, one or more drive rollers may be disposed along the drive shaft or axle so that the drive device may be adapted for different paper widths by simply changing the location of the several idler rollers associated with the drive rollers.

In a further embodiment of the invention a plurality of drive rollers and a corresponding plurality of idler rollers may be disposed closely adjacent to one another in the extreme case. By so doing, an optimally uniformly distributed tension exerted on the paper web is obtained, however, in this embodiment under certain conditions the drive device must be disposed at a sufficient distance from the recording head so that the recording fluid is sufficiently dry when it reaches the drive device in order to prevent smudging of the recorded data.

In addition to the structure described above, the idler rollers in the paper transport device disclosed herein may be spring-loaded, and may be spring-loaded such that the spring force is adjustable. The idler rollers may be mounted with respect to the drive rollers such that the idler rollers can be lifted so as to create a gap between the idler rollers and the drive rollers for insertion of the paper web. The paper web may be supported by a pivotally seated paper table which, in an idle position, is normally in a table plane disposed directly below the paper conducted between the drive rollers and the idler rollers. The paper table has recesses in registry with the drive rollers and idler rollers to permit contact with the paper at those locations by the rollers. The idler rollers may be mounted at the end of a lever which is spring-loaded so as to lift the idler rollers from the surface of the paper table when the paper table is pivoted out of the table plane. When new paper is introduced, for example, into the transport device, the paper table is folded out of the way and the paper web is threaded between the guide rollers past the recording head. Before the paper table is again lowered into position, the paper web may be drawn over the paper table and conducted through the slightly lifted idler rollers. When the idler rollers are completely lowered, those rollers are resiliently pressed against the driver rollers so that the paper is placed in secure engagement with the transport means.

DESCRIPTION OF THE PREFERRED EMBODIMENTS

Figure 1:
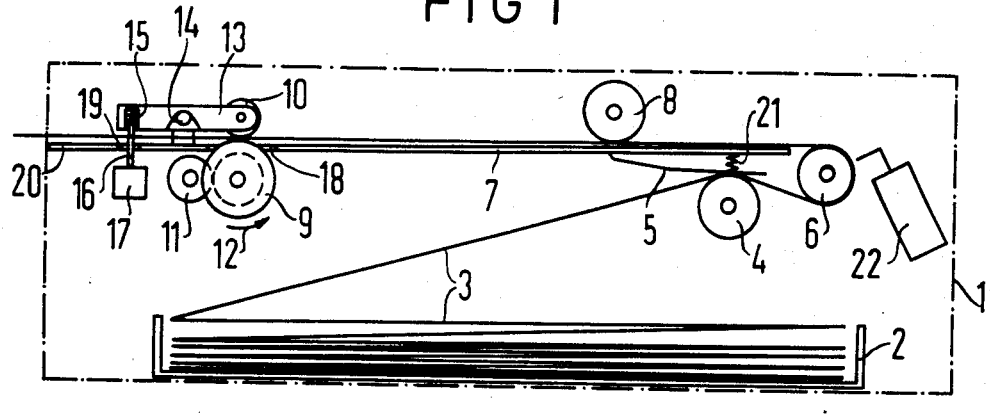
FIG. 1 is a side view of a paper transport device for a recorder constructed in accordance with the principles of the present invention.
Figure 2:
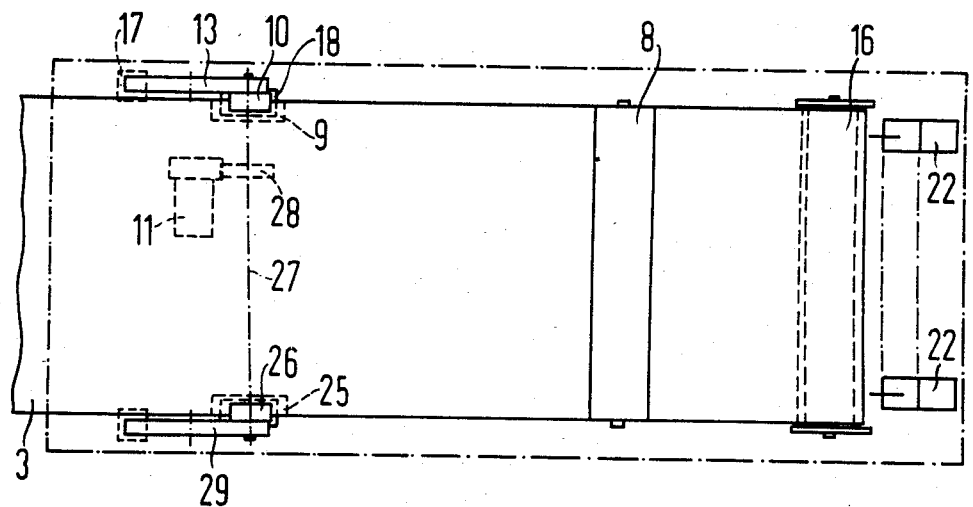
FIG. 2 is a plan view of the paper transport device shown in FIG. 1.

A recording device 1 having a paper tray 2 which is loaded with a stack of folded recording paper 3 is shown in FIG. 1. As viewed the transport direcion, that is the direction of paper movement through the recorder 1, the paper first is removed from the paper stack and moves between a braking roller 4 and a pressure plate 5. The paper web is then conducted around a turning roller 6 onto a paper table 7 which supports the paper web as it is conducted past a blotter roller 8 for drying the recording fluid which is applied thereto by a recording means 22. The paper web is finally conducted through a nip formed between drive rollers such as the drive roller 9 and idler rollers such as the idler roller 10. Although only one nip can be seen in the side view of FIG. 1, it will be understood that an identical nip, as can be seen in FIG. 2, may be utilized in combination therewith, the second nip being formed by a second drive roller 25 and a second idler roller 26.

The drive roller 9 is driven in the direction of the arrow 12 by a drive means 11, such as a motor. The idler roller 10 is mounted to an end of a lever 13 which is pivotally mounted on a spring-loaded bearing 14 connected to the paper table 7. The other end of the lever 13 has a pin 16 acting against a spring 15 which, in the position of the lever 13 illustrated in FIG. 1, strikes against a stop 17 which is rigidly mounted to the recorder 1 and which produces the pressure force for the idler roller 10. The paper table 7 is provided with recesses 18 and 19 in registry with the drive rollers and the idler rollers as well as in registry with the pin 16. The table 7 is pivotally mounted about an axis 20.

The pressure plate 5 is resiliently pressed against the braking roller 4 by means of a spring 21. The effect of the pressure plate 5 and the braking roller 4 is that the paper 3 is held tightly from the nip formed by those two elements to the nip formed by the idler rollers and the drive rollers.

Recording of data on the paper web 3 is undertaken by means of a recording means 22, which may be, for example, an ink jet printer, which is disposed in the region of the turning roller 6 and essentially records data on the web 3 in a direction perpendicular to the forward feed direction of the web 3.

In the plan view of the transport device shown in FIG. 2, identical elements already identified above are provided with the same reference numerals. Both drive rollers 9 and 25 are mounted on a common shaft or axle 27 which is driven by the drive means 11 via a gear train 28. The idler rollers 10 and 26 which are respectively associated with the drive rollers 9 and 25 are respectively mounted on levers 13 and 29 of the type described in FIG. 1. As can be seen in FIG. 2, except for the narrow edge strip of the web 3 which engages the drive and idler rollers, substantially the entire paper width is available for recording of data thereon. At the same time, a symmetrical pull or tension is exerted on the paper and thus a uniform paper transport is assured for any desired length of transport path.

Although modifications and changes may be suggested by those skilled in the art it is the intention of the inventors to embody within the patent warranted hereon all changes and modifications as reasonably and properly come within the scope of their contribution to the art.

We claim as our invention:

1. A paper transport device combined with a recorder means, said transport device having a means for supporting clean paper, a means for forwardly guiding the paper past said recording means, and a motor-driven means for moving said paper:
    p0 at least two driven rollers each mounted on an axle, said axle being driven by said motor and said drive rollers being disposed a distance from one another at right angles relative to a direction of paper forward feed,
    means for mounting said drive rollers on said axle permitting said drive rollers to freely rotate at a same or faster speed than said axle in the same direction of rotation as said axle for automatically preventing skewed transport of said paper through said device, and locking said rollers when attempted to be rotated in an opposite direction; and
    two idler rollers mounted adjacent to and respectively associated with each drive roller for forming a paper-receiving nip.

2. The combination paper transport device and recorder means of claim 1 wherein said drive rollers are mounted on a common drive shaft.

3. The combination paper transport device and recorder means of claim 1 wherein said drive rollers are disposed substantially at the edges of said paper at right angles relative to said forward feed direction.

4. The combination paper transport device and recorder means of claim 1 further comprising a means for spring-loading said idler rollers.

5. The combination paper transport device and recorder means of claim 1 further comprising a means for lifting said idler rollers away from said drive rollers such that a gap is formed between said idler rollers and said drive rollers.

6. The combination paper transport device and recorder means of claim 1 further comprising:
a pivotally mounted paper table normally disposed in a table plane directly beneath said paper, said paper table having a plurality of recesses in registry with said drive rollers for permitting engagement of said drive rollers with said paper; and
a lever on which said idler rollers are mounted at one end, said lever being spring-loaded so as to lift said idler rollers off of the surface of said paper table when said paper table is pivoted out of said table plane.

* * * * *